United States Patent
Oswal et al.

(10) Patent No.: US 7,782,824 B2
(45) Date of Patent: Aug. 24, 2010

(54) METHOD AND SYSTEM FOR HANDLING A MOBILE ENDPOINT IN A WIRELESS NETWORK

(75) Inventors: Anand K. Oswal, Santa Clara, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 11/458,795

(22) Filed: Jul. 20, 2006

(65) Prior Publication Data
US 2008/0019332 A1    Jan. 24, 2008

(51) Int. Cl.
*H04W 4/00* (2009.01)

(52) U.S. Cl. .............. 370/338; 370/352; 370/331; 455/442; 455/437

(58) Field of Classification Search .......... 370/338; 455/442, 552.1, 437
See application file for complete search history.

(56) References Cited

U.S. PATENT DOCUMENTS

| | | | |
|---|---|---|---|
| 6,360,100 B1 * | 3/2002 | Grob et al. | 455/442 |
| 6,466,964 B1 | 10/2002 | Leung et al. | 709/202 |
| 6,564,057 B1 * | 5/2003 | Chun et al. | 455/437 |
| 6,615,263 B2 | 9/2003 | Dulai et al. | 709/225 |
| 6,621,820 B1 | 9/2003 | Williams et al. | 370/395.31 |
| 6,684,256 B1 | 1/2004 | Warrier et al. | 709/238 |
| 6,708,225 B1 | 3/2004 | Cho et al. | 709/317 |
| 6,728,884 B1 | 4/2004 | Lim | 713/201 |
| 6,742,036 B1 | 5/2004 | Das et al. | 709/226 |
| 6,760,444 B1 | 7/2004 | Leung | 380/270 |
| 6,771,623 B2 | 8/2004 | Ton | 370/331 |
| 6,785,256 B2 | 8/2004 | O'Neill | 370/338 |
| 6,826,173 B1 | 11/2004 | Kung et al. | 370/352 |
| 6,829,709 B1 | 12/2004 | Acharya et al. | 713/160 |
| 6,839,338 B1 | 1/2005 | Amara et al. | 370/338 |
| 6,889,321 B1 | 5/2005 | Kung et al. | 713/153 |
| 6,907,501 B2 | 6/2005 | Tariq et al. | 711/118 |
| 6,915,345 B1 | 7/2005 | Tummala et al. | 709/225 |
| 6,920,503 B1 | 7/2005 | Nanji et al. | 709/230 |
| 6,922,404 B1 | 7/2005 | Narayanan et al. | 370/338 |
| 6,947,401 B2 | 9/2005 | El-Malki et al. | 370/331 |

(Continued)

OTHER PUBLICATIONS

Draft—TR45—PN-3-4732-RV4 (to be published as TIA-835.1-D), 32 pages.

(Continued)

*Primary Examiner*—David Q Nguyen
(74) *Attorney, Agent, or Firm*—Baker Botts L.L.P.

(57) ABSTRACT

A method of handling a mobile endpoint in a wireless network includes routing data for a mobile endpoint through a first base station. The mobile endpoint is wirelessly connected to the first base station and has a first signal strength at the first base station. The method also includes routing data for the mobile endpoint through the first base station and a second base station. The mobile endpoint is wirelessly connected to the first base station and has a second signal strength at the second base station. The second signal strength is above a first level. The method also includes routing data for the mobile endpoint through the second base station. The mobile endpoint is wirelessly connected to the second base station and has a third signal strength at the second base station. The third signal strength is above a second level.

38 Claims, 2 Drawing Sheets

U.S. PATENT DOCUMENTS

| | | | |
|---|---|---|---|
| 6,978,128 B1 | 12/2005 | Raman et al. | 455/414 |
| 6,980,802 B2 | 12/2005 | Jung | 455/436 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,024,687 B2 | 4/2006 | Chaudhuri et al. | 726/3 |
| 2003/0217165 A1 | 11/2003 | Buch et al. | 709/229 |
| 2004/0203791 A1* | 10/2004 | Pan et al. | 455/442 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 121 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 259 pages, Mar. 2006.

3GPP2 C.S0024-A, 3rd Generation Partnership Project 2 '3GPP2', "cdma2000 High Rate Packet Data Air Interface Specification," Version 2.0, 1,277 pages, Jul. 2005.

B. Aboba, et al., "Extensible Authentication Protocol (EAP)," Network Workikng Group, RFC 3748, http://www.ietf.org/rfc/rfc3748.txt, 59 pages, May 19, 2006.

B. Aboba, D. Simon, "PPP EAP TLS Authentication Protocol," Network Working Group, RFC 2716, http://www.ietf.org/rfc/rfc2716.txt, 22 pages, May 19, 2006.

W. Simpson, "PPP Challenge Handshake Authentication Protocol (CHAP)," Network Working Group, RFC 1994, http://www.ietf.org/rfc/rfc1994.txt, 12 pages, May 19, 2006.

W. Simpson, "The Point-to-Point (PPP)," Network Working Group, RFC 1661, http://www.ietf.org/rfc/rfc1661.txt, 47 pages, May 19, 2006.

P. Eronen, et al., "Diameter Extensible Authentication Protocol (EAP) Application," Network Working Group, RFC 4072, http://www.ietf.org/rfc/rfc4072.txt, 29 pages, May 19, 2006.

P. Calhoun, et al., "Diameter Base Protocol," Network Working Group, RFC 3588, http://www.ietf.org/rfc/rfc3588.txt, 129 pages, May 19, 2006.

Draft—TR45—PN-3-4732-RV4 (to be published as TIA-835.1-D), 32 pages, Printed May 19, 2006.

Draft—TR45—PN-3-4732-RV4 (to be published as TIA-835.2-D), 93 pages, Printed May 19, 2006.

Draft—TR45—PN-3-4732-RV4 (to be published as TIA-835.3-D), 36 pages, Printed May 19, 2006.

Draft—TR45—PN-3-4732-RV4 (to be published as TIA-835.4-D), 70 pages, Printed May 19, 2006.

Draft—TR45—PN-3-4732-RV4 (to be published as TIA-835.5-D), 72 pages, Printed May 19, 2006.

Draft—TR45—PN-3-4732-RV4 (to be published as TIA-835.6-D), 36 pages, Printed May 19, 2006.

* cited by examiner

METHOD AND SYSTEM FOR HANDLING A MOBILE ENDPOINT IN A WIRELESS NETWORK

TECHNICAL FIELD OF THE INVENTION

This invention relates generally to networking systems and, more particularly, to a method and system for handling a mobile endpoint in a wireless network.

BACKGROUND

As the internet continues to grow in popularity and pervasiveness so do the products and services that use it. One of the ways in which these emerging products and services are accessing the internet (as well as other networks) is through the use of wireless connections. Mobile endpoints using a wireless connection provide users with access to a network without being tied down to a single location. In order to provide the ability for a mobile endpoint to access the network over a large area, multiple base stations may be required. As the endpoint moves around the large area its signal may grow weaker at one base station while growing stronger at another base station. At some point it may be desirable to transfer the mobile endpoint from the first base station to the second base station. This handoff can include both packet loss and latency. These undesirable effects caused by moving between base stations in a wireless network create a poor user experience.

SUMMARY

In accordance with particular embodiments, a method and system for handling a mobile endpoint in a wireless network is provided which substantially eliminates or reduces the disadvantages and problems associated with previous systems and methods.

In accordance with a particular embodiment, a method of handling a mobile endpoint in a wireless network includes routing data for a mobile endpoint through a first base station. The mobile endpoint is wirelessly connected to the first base station and has a first signal strength at the first base station. The method also includes routing data for the mobile endpoint through the first base station and a second base station. The mobile endpoint is wirelessly connected to the first base station and has a second signal strength at the second base station. The second signal strength is above a first level. The method also includes routing data for the mobile endpoint through the second base station. The mobile endpoint is wirelessly connected to the second base station and has a third signal strength at the second base station. The third signal strength is above a second level.

The method may also include multicasting data for the mobile endpoint to the first base station and the second base station. The method may further include buffering the data for the mobile endpoint at the second base station while the mobile endpoint is connected to the first base station.

In particular embodiments the method may further include enabling a sequence number in the data for the mobile endpoint. The data may comprise data packets, each data packet numbered with a sequence number. The method may further include determining the sequence number of the last data packet successfully routed to the mobile endpoint through the first base station. The method may also include sending data packets to the mobile endpoint through the second base station. The data packets may have sequence numbers greater than the sequence number of the last data packet successfully routed to the mobile endpoint through the first base station.

In accordance with another embodiment, a method for handling a mobile endpoint in a wireless network includes detecting a mobile endpoint having a signal strength. Upon the signal strength exceeding a first threshold, the method further includes receiving data for the mobile endpoint. The data for the mobile endpoint is also sent to a first base station. The first base station sends the data to the mobile endpoint via a first wireless connection. Upon the signal strength exceeding a second threshold the method also includes establishing a second wireless connection with the mobile endpoint. The second wireless connection with the mobile endpoint terminates the first wireless connection between the mobile endpoint and the first base station. The method additionally includes sending the data to the mobile endpoint via the second wireless connection.

Certain embodiments of the present invention may provide a number of technical advantages. For example, according to one embodiment of the present invention, data for a mobile endpoint may be routed to both a serving base station and a target base station. Accordingly, the data for the mobile endpoint may already be at the target base station, thereby allowing for a more seamless handoff of the mobile endpoint from the serving base station to the target base station. This may further facilitate the enablement of real-time activities for a mobile endpoint in an area having multiple base stations. Another example of a technical advantage provided by particular embodiments of the present invention is the use of policies that may limit or control the timing of multicasting during a handoff. Accordingly, a service provider may have more options and flexibility in the services it may provide, and how they may bill their customers for their services.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DESCRIPTION OF EXAMPLE EMBODIMENTS

Figure 1:
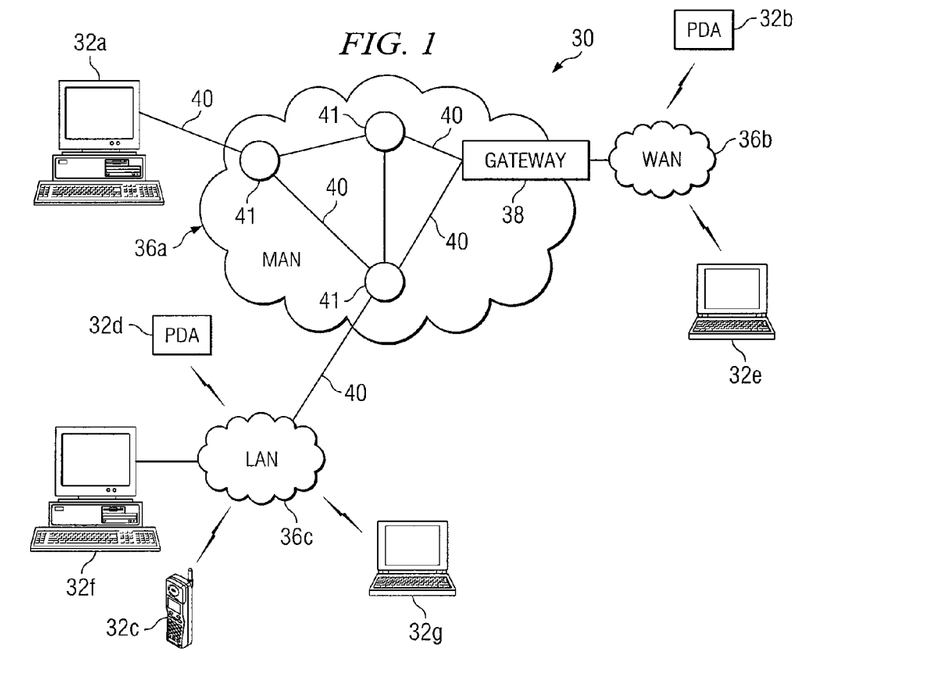
FIG. 1 is a simplified block diagram illustrating a network that may include multiple base stations in accordance with one embodiment of the present invention.

FIG. 1 is a simplified block diagram illustrating a network that may include multiple base stations in accordance with one embodiment of the present invention. Network 30 includes a plurality of endpoints 32a-32g having the ability to transmit and receive data and control signals between each other using one or more of sub-networks 36a-36c. Within each sub-network 36a-36c may be several nodes (e.g., nodes 41 of sub-network 36a) connected by various segments (e.g., segments 40 of sub-network 36a) that may aid in the facilitation of communicating data between endpoints. Also within sub-networks 36a-36c may be various components, such as base stations, that may provide mobile endpoints (e.g., endpoints 32b-32e and 32g) with a wireless connection to its respective sub-network. The term base station may generally be used to refer to a network component that provides a wireless connection to a network. For example in an IEEE 802.16 environment base station may refer to a WiMax base station, in an IEEE 802.11b environment base station may refer to a WiFi access point. Network 30 also includes gateway 38 which may allow different sub-networks running different protocols to transfer data.

When a sub-network includes multiple base stations, there arises a need to determine how to handle the handoff of a mobile endpoint as it passes from one base station to the next. Particular embodiments provide for handling the transfer of the mobile endpoint by multicasting the data for the mobile endpoint to the current serving base station and any likely future target base stations. Thus, when it is time to transfer the mobile endpoint, the data for that mobile endpoint is already being directed to the target base station, thereby facilitating a seamless handoff.

In the illustrated embodiment, network 30 may facilitate one or more different services. For example, network 30 may facilitate internet access, online gaming, file sharing, or any other type of functionality typically provided by a network. Network 30 may also facilitate a voice over internet protocol (VoIP) call between endpoints 32a and 32c, a video over IP call between endpoints 32a and 32f, or any other type of call typically provided via a network.

In the illustrated embodiment, sub-network 36a is a metropolitan area network (MAN) which couples endpoint 32a with sub-networks 36b and 36c, and sub-networks 36b and 36c with each other. MAN 36a can be distributed across multiple cities and geographic regions. Sub-network 36b is a wide area network (WAN) which may be similar to MAN 36a and which couples endpoints 32b and 32e with one another and with MAN 36a. WAN 36b may include one or more base stations that may provide a wireless connection for endpoints 32b and 32e. Sub-network 36c is a local area network (LAN) which couples endpoints 32c, 32d, and 32f with MAN 36a. LAN 36c may include one or more base stations that may provide a wireless connection for endpoints 32c, 32d, and 32g. Any of sub-networks 36a-36c may comprise, in whole or in part, one or more radio access networks. The interconnection of sub-networks 36a-36c may enable endpoints 32a-32g to communicate data and control signaling between each other as well as allowing any intermediary components or devices to pass data and control signals. Accordingly, users of endpoints 32a-32g, may be able to send/receive data/control signals between and among each network component coupled to one or more of networks 36a-36c.

As illustrated, MAN 36a includes a plurality of segments 40 and nodes 41 that couple endpoint 32a and LAN 36c with gateway 38 and WAN 36b (WAN 36b and LAN 36c may similarly contain nodes and segments). Therefore, a user of endpoint 32a is provided with access to endpoints 32b-32g. Furthermore, endpoints 32a-32g, may all communicate data and control signals among each other. Nodes 41 may include any combination of network components, session border controllers, gatekeepers, base stations, call managers, conference bridges, routers, hubs, switches, gateways, endpoints, edgepoints, or any other hardware, software, or embedded logic implementing any number of communication protocols that allow for the exchange of packets in communication system 30. WAN 36b and LAN 36c may include similar components and provide similar functionality as MAN 36a.

Any of sub-networks 36a-36c of network 30 may include one or more edgepoints. An edgepoint may be a real-time transport protocol (RTP) media relay point that may be incorporated within one or more of the devices or components depicted in FIG. 1. For example, if nodes 41 were IP to IP gateways, then any of nodes 41 may include an edgepoint. An edgepoint may also be included in any other network component or device that may, in effect, define a boundary for a particular network, such as network 36a. Some other possible devices that may incorporate an edgepoint include a session border controller and a policy execution point. The use of an edgepoint may aid a network administrator in ascertaining the contribution of his network to any impairments a call may experience.

Although the illustrated embodiment includes three sub-networks 36a-36c, the terms "network" or "sub-network" should be interpreted as generally defining any network capable of transmitting audio and/or video telecommunication signals, data, and/or messages, including signals, data or messages transmitted through text chat, instant messaging and e-mail. Any one of sub-networks 36a-36c may be implemented as a local area network (LAN), wide area network (WAN), global distributed network such as the Internet, Intranet, Extranet, or any other form of wireless or wireline networking. Generally, sub-networks 36a-36c provide for the communication of packets, cells, frames, or other portions of information (generally referred to as packets herein) between endpoints 32a-32g. Network 30 may include any number and combination of segments 40, nodes 41 or endpoints 32a-32g.

In particular embodiments, sub-networks 36a-36c may employ protocols that allow for the addressing or identification of endpoints and/or nodes coupled to MAN 36a, WAN 36b or LAN 36c. For example, using Internet protocol (IP), each of the components coupled together by LAN 36c in communication system 30 may be identified in information directed using IP addresses. In this manner, sub-network 36a-36c may support any form and/or combination of point-to-point, multicast, unicast, or other techniques for exchanging media packets among components in communication system 30. Any network components capable of exchanging audio, video, or other data using frames or packets are included within the scope of the present invention.

Any of sub-networks 36a-36c may be directly coupled to other IP networks including, but not limited to, the Internet. Because IP networks share a common method of transmitting data, signals may be transmitted between devices located on different, but interconnected, IP networks. In addition to being coupled to other IP networks, any of sub-networks 36a-36c may also be coupled to non-IP networks through the use of interfaces or components, for example gateway 38. IP networks transmit data by placing the data in packets and sending each packet individually to the selected destination, along one or more communication paths. Unlike a circuit-switched network (like a PSTN), a dedicated circuit is not required for the duration of a call or fax transmission over IP networks.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

As mentioned above endpoints 32c, 32d and 32g may be coupled to LAN 36c via a wireless connection (facilitated by, for example, a base station) and endpoints 32b and 32e may be coupled to WAN 36b via a wireless connection. Endpoint 32f may be coupled to LAN 36c via a standard wired connection. In particular embodiments, the wireless connection may utilize IEEE 802.16 commonly known as worldwide interoperability for microwave access (WiMax) which allows wireless access over a large area (e.g., up to 31 miles). In some embodiments the wireless connection may utilize IEEE 802.11b commonly known as wireless fidelity (WIFI), or it may utilize code division multiple access (CDMA), global system for mobile communications (GSM) (for use with cellular phones), universal mobile telecommunications system (UMTS), or any other type of wired or wireless access.

It will be recognized by those of ordinary skill in the art that endpoints 32a-32g and/or gateway 38 may be any combination of hardware, software, and/or encoded logic that provides data or network services to a user. For example, endpoints 32a-32g may include an IP telephone, a computer, a video monitor, a camera, a personal data assistant, a cell phone or any other hardware, software and/or encoded logic that supports the communication of packets of media (or frames) using sub-networks 36a-36c. Endpoints 32a-32g may also include unattended or automated systems, gateways, other intermediate components or other devices that can send or receive data and/or signals. Although FIG. 1 illustrates a particular number and configuration of endpoints, segments, nodes, and gateways, network 30 contemplates any number or arrangement of such components for communicating data. In addition, elements of network 30 may include components centrally located (local) with respect to one another or distributed throughout network 30.

Figure 2:
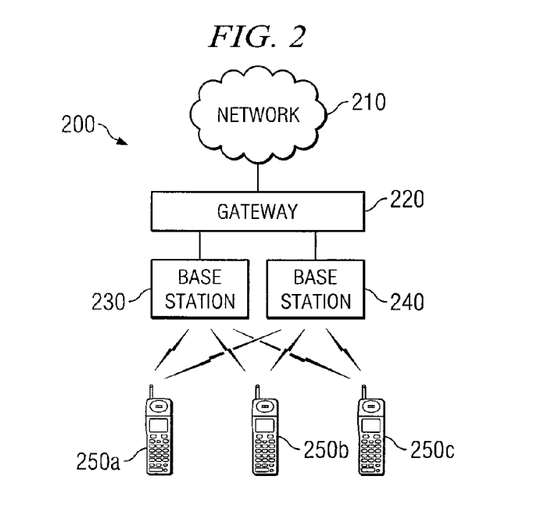
FIG. 2 is a simplified block diagram that illustrates the hand-off of a mobile endpoint between two base stations of a wireless network in accordance with one embodiment of the present invention.

FIG. 2 is a simplified block diagram that illustrates an operation of two base stations of a wireless network in accordance with one embodiment of the present invention. Mobile communication network 200 depicts an example network in which gateway 220 couples base stations 230 and 240 to network 210.

In order to achieve the teachings discussed herein, software and/or hardware may reside within base stations 230 and 240 and/or gateway 220. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of base stations 230 and 240 and gateway 220 in the context of mobile communication network 200 and, accordingly, it should be construed as such.

In particular embodiments, mobile communication network 200 may be an IP network. Network 210 may be one or more of any of the networks discussed above with respect to FIG. 1 (e.g., a LAN, a WAN, a global distributed network such as the Internet, Intranet, Extranet, or any other form of wireless or wireline networking). Base stations 230 and 240 may provide mobile endpoint 250 with wireless access to network 210. In some embodiments this wireless access may be via WiMax, WIFI, CDMA, GSM, UMTS, or any other type of wired or wireless access.

Each base station, 230 and 240, may have a certain coverage area associated with it. The coverage area may be the geographic area for which the base station is able to provide wireless network access. To ensure that there are no gaps in coverage, it may be that at least a portion of the coverage area of base station 230 overlaps the coverage area of base station 240. An endpoint, within the coverage area of one or more base stations, capable of transmitting or receiving data (using a protocol recognized by a base station) may only be connected to a single base station. When an endpoint associated with a particular base station, for example base station 230, moves from the coverage area of base station 230 into the coverage area of another base station, such as base station 240, it may become necessary to transfer, or otherwise change which base station the endpoint is associated with, from base station 230 to base station 240. In some embodiments gateway 220 may decide when to transfer an endpoint, for example, based on the strength of a signal either at the mobile endpoint or at the base station. In particular embodiments it may be decided that an endpoint is transferred based on the amount of noise that may exist between the endpoint and the base station, the amount of traffic through each base station and/or gateway, the amount of traffic over each radio channel, or any other factor or factors that may be desirable to consider in determining when and where to transfer an endpoint.

In order to help illustrate some of the features and benefits of the present invention, endpoint 250 has been depicted at three different moments of time to show the movement of endpoint 250 between base stations 230 and 240. Accordingly, endpoint 250 may initially (endpoint 250a) have a connection with base station 230 and then as it moves closer to base station 240 (endpoint 250b) it may eventually end up with a connection with base station 240 (endpoint 250c). Endpoint 250 may be any mobile endpoint capable of sending or receiving data wirelessly, such as a PDA, a laptop or a cell phone. In some embodiments endpoint 250 may support IP.

To begin, endpoint 250a and base station 230 may have established a wireless connection using, for example, WiMax. Thus, data for endpoint 250a may be routed through base station 230. Gateway 220 may have determined that endpoint 250a should be associated with base station 230 based on the strength of a signal between endpoint 250a and base station 230, or any of the factors discussed above. Gateway 220 may determine the strength of the signal based on information (e.g., the strength of the base station's signal at the endpoint) received from endpoint 250a via base station 230 and/or from information (e.g., the strength of the endpoint's signal at the base station) received directly from base station 230. While endpoint 250a is associated with base station 230, base station 230 may be referred to as the serving base station. Base station 230 may remain the serving base station until endpoint 250 is transferred to a different base station. For as long as base station 230 is endpoint 250a's serving base station, data for endpoint 250 may be directed through base station 230. It should be noted that data for an endpoint may include both data sent to the endpoint and data received from the endpoint.

At some point, endpoint 250a may move. This movement may not in itself cause any changes in endpoint 250a, base stations 230 and 240, or gateway 220. However, should endpoint 250a move towards the coverage area of base station 240, gateway 220 may anticipate that endpoint 250b is moving towards base station 240 and may soon need to be connected thereto. In this situation, base station 240 may be referred to as a target base station. Gateway 220 may anticipate a potential transfer of endpoint 250b to base station 240 based on information received from endpoint 250a via base station 230 (e.g., the strength of base station 240's signal at endpoint 250b) and/or from information received directly from base station 240 (e.g., the strength of endpoint 250b's signal at base station 240).

At some point, endpoint 250b may move such that the strength of the signal between endpoint 250b and the target base station, base station 240, may exceed a first threshold value. When gateway 220 receives notice of this it may begin to bicast or multicast the data for endpoint 250 to both base stations 230 and 240. However, base station 240 may not yet transmit this information to endpoint 250b because base station 240 is still the target base station, not the serving base station. It is the serving base station, base station 230, which may be responsible for relaying the data to endpoint 250. Thus, even though data for endpoint 250b is being sent to both base stations, endpoint 250b is only receiving the data from base station 230. This may be so that when it is time to actually transfer endpoint 250b to base station 240 the data for endpoint 250b is already there. Because data for endpoint 250b is being concurrently sent to both the serving and target base stations, when endpoint 250 is finally transferred to base station 240 there may be little or no data loss or latency associated with the handoff.

Gateway 220 may continue to route data for endpoint 250b to both base stations 230 and 240 until gateway 220 receives notice that the signal between endpoint 250b and base station 240 has exceeded a second threshold value, or any of the factors listed above. Both the first and second threshold values may vary depending on operational needs and system abilities and requirements. In some embodiments, the relationship between the first and second threshold values may be such that the multicasting window is kept small. More specifically, the second threshold may be slightly higher than the first threshold so that if endpoint 250b is on the move the strength of the signal should cross the second threshold shortly after crossing the first threshold. Limiting the duration of the window during which gateway 220 is multicasting data for endpoint 250 may reduce the demand on the resources of mobile communication network 200.

When endpoint 250b gets close enough to base station 240 for the signal strength to cross the second threshold, gateway 220 may stop routing the data for endpoint 250c to both base stations and may route the data to base station 240. This may be done at the same time or shortly after base station 240 transitions from being the target base station to being the serving base station. Thus, once base station 240 is the serving base station, and endpoint 250c is connected thereto, gateway 220 may no longer route data to base station 230.

Similarly, if network 200 was configured, for example, to balance the load at each base station, then if the traffic at the serving base station exceeded a certain threshold then gateway 220 may begin to route data to multiple base stations. Then if the traffic at the serving base station exceeded a certain second, higher, threshold then gateway 220 may stop routing data to multiple base stations and may route the data to the selected target base station (as before, this may be done after or concurrently with the transition of the mobile endpoint to the selected target base station, which then becomes the serving base station). Thus, once base station 240 is the serving base station, and endpoint 250 is connected thereto, gateway 220 may no longer route data to base station 230. As may be apparent one skilled in the art may envision other scenarios involving other factors in determining when to begin to multicast data for the mobile endpoint and when to stop multicasting the data; these scenarios may be incorporated in various particular embodiments.

Some embodiments may use buffers to temporarily store the data for endpoint 250 before sending it on. The data received by endpoint 250 may therefore, be slightly delayed while it waits in the buffer. In particular embodiments, packets of data for endpoint 250 may be associated with a sequence number. The sequence number may be used to help ensure that endpoint 250 does not receive duplicate packets and that packets are not lost. The sequence numbers may be used during the handoff and/or during regular data transfer. More specifically, once endpoint 250 is actually transferred from the serving base station to the target base station and the target base station is ready to begin transmitting data to endpoint 250, base station 240 may begin transmitting the data packet associated with the next sequence number after the last data packet successfully sent by base station 230. In some embodiments the data may be temporarily stored in buffers in both base stations. Then after each successful transmission of a packet of data, the next packet may be sent. Because the data is being sent from a buffer, and because the buffers of both base stations may contain similar data, the transition from the serving base station to the target base station may contain little or no latency or packet loss.

In some networks there may be more than two base stations. In such networks it is possible that endpoint 250 may be within the coverage area of three or more base stations (one serving base station and at least two target base stations). In such a situation gateway 220 may multicast the data for endpoint 250 to all the potential target base stations. It should be noted that all base stations that are not currently the serving base station are not necessarily target base stations. Rather, it is those base stations that have the mobile endpoint within their coverage area (or in close proximity thereto) and which are not already the serving base station for the mobile endpoint, that are the target base stations.

Particular embodiments may include the use of policies in determining when to invoke the use of multicasting for transitioning a mobile endpoint from a serving base station to a target base station. These policies may be customized to meet any desirable requirements a user may want to implement. For example, the policies may restrict the use of multicasting during handoff to certain classes of users (e.g., upper management or sales) or particular users. The policies may limit the use of multicasting handoffs to particular types of data or data-flows (e.g., real-time data). Another example may be policies that allow multicasting handoffs based on what resources, and the loads of those resources, are used in transmitting the data (e.g., the data path, destination, source, ports, number of endpoints connected to base station, or the activity of the base endpoint) through mobile communication network 200.

It will be recognized by those of ordinary skill in the art that mobile communication network 200 is merely an example configuration of a wireless network in which multicasting may be used during the handoff of a mobile endpoint from one base station to the next. Other embodiments may include any number of base stations, gateways, endpoints, networks, and/or other components to accomplish the functionality and features described herein. For example, although mobile communication network 200 is illustrated and described as including gateway 220 and base stations 230 and 240, other embodiments may have multiple gateways, with one or more base stations coupled thereto.

Figure 3:
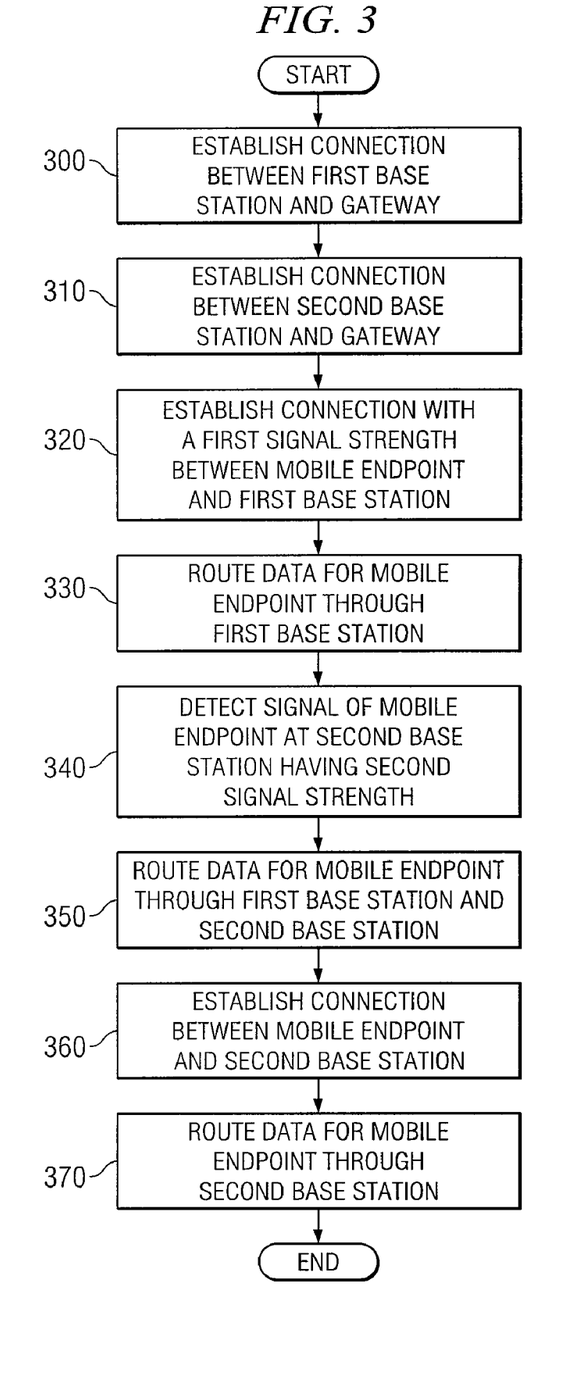
FIG. 3 is a flowchart depicting a method for handling a mobile endpoint in a wireless network in accordance with particular embodiments of the present invention.

FIG. 3 is a flowchart depicting a method for handling a mobile endpoint in a wireless network in accordance with particular embodiments of the present invention. The method begins at steps 300 and 310 where a gateway establishes a connection with a first base station and a second base station. For simplicity, only a single gateway and only two base stations are used in the method depicted in FIG. 3. However, other embodiments may use any number of gateways and/or base stations. Furthermore, while steps 300 and 310 are depicted as separate steps, the gateway may establish the connection with the two base stations concurrently.

Once the gateway has established a connection with a base station, the gateway may be able to route data through the base station to any endpoints that may be connected (either wirelessly or via a landline) to the base station. Thus, upon completing step 320, in which a connection is established between a mobile endpoint and the first base station, it is possible to route data for the mobile endpoint through the first base station. The connection between the base station and the mobile endpoint may be a wireless connection having a first signal strength associated there with. The first signal strength may be related to such factors as the distance between the first base station and the mobile endpoint and what is between the mobile endpoint and the first base station (e.g., drywalls, wiring, glass, or other wireless signals).

As mentioned above, once the mobile endpoint is connected to the first base station, the gateway may begin to route data for the mobile endpoint through the first base station. This is shown in step 330. In some embodiments, as the gateway routes packets of data to the mobile endpoint, via the first base station, it may attach a sequence number to each packet of data. The sequence number may be helpful in ensuring that all the packets of data arrive at the mobile endpoint and in the proper sequence. Because the connection between the mobile endpoint and the first base station is wireless, it may be possible for the mobile endpoint to freely move within the coverage area associated with the first base station. While he is within the coverage area of the first base station it is possible for him to remain connected to the first base station.

The mobile endpoint may also move out of the coverage area of the first base station and into the coverage area of the second base station. As he does, the strength of the signal between the mobile endpoint and the first base station may decrease while the strength of the signal between the mobile endpoint and the second base station may increase. At step 340, the signal between the second base station and the mobile endpoint may be detected. This may occur when the mobile endpoint is within range of the second base station. Either the second base station or the mobile endpoint may be capable of notifying the gateway that the mobile endpoint may soon enter the coverage area of the second base station. As may be apparent to one skilled in the art, the area serviceable by a base station (i.e., its coverage area) may be less than the area in which it is possible to detect the mobile endpoint. Accordingly, it may be possible to detect the mobile endpoint before it is possible to provide reliable wireless service to the mobile endpoint.

Once the gateway receives notification that the mobile endpoint is approaching the coverage area of the second base station the gateway may begin to route data to the second base station as well as the first base station. This may be done at step 350 by multicasting the data for the mobile endpoint to both base stations. The second base station may be referred to as the target base station. While data for the mobile endpoint is being routed to both the first and second base stations, the mobile endpoint is only receiving the data from one base station, the first base station. This is because the mobile endpoint may only receive its data from the base station to which it is connected. The base station to which the mobile endpoint is connected to may be referred to as the serving base station. In some embodiments the gateway may begin to multicast the data for the mobile endpoint when the second signal strength (the signal between the second base station and the mobile endpoint) exceeds a first threshold. In particular embodiments, even if the mobile endpoint has crossed the first threshold, the gateway may not multicast the mobile endpoint's data to multiple base stations. This may be because either the mobile endpoint, or its data, does not satisfy the criteria of a policy that may be used in determining when to limit the use of multicasting during handoffs. The policy may be designed to minimize the impact on network resources caused by multicasting data to multiple endpoints by limiting multicasting to handoffs involving certain types of data or certain endpoints. Some example policies have been discussed above with respect to FIG. 2.

At some point the strength of the second signal may cross a second threshold. The second threshold may be slightly higher than the first threshold. The larger the gap between the first and second threshold, the longer the gateway may have to multicast data for the mobile endpoint to multiple base stations. This may use more of the network's resources than simply routing data for the mobile endpoint to a single base station. Thus it may be desirable to keep the gap between the two thresholds relatively low.

Once the strength of the second signal crosses the second threshold, at step 360, a connection may be established between the second base station and the mobile endpoint. While the connection is being established between the mobile endpoint and the second base station, the connection between the mobile endpoint and the first base station may be destroyed. The second base station may therefore go from being the target base station to being the serving base station.

After the connection between the second base station and the mobile endpoint has been established the data for the mobile endpoint may be routed through the second base station at step 370. As discussed above, once the second base station becomes the serving base station the data for the mobile endpoint may come from the second base station. In those embodiments in which the gateway attaches sequence numbers to the packets of data it routes to the base stations, the second base station may begin its transmission of data for the mobile endpoint with the packet of data having the next sequence number after the sequence number of the last successfully transmitted packet of data sent by the first base station. Thus, the data flow to the mobile endpoint may experience little or no latency or lost data.

In some embodiments, the base stations may buffer the data for the mobile endpoint, and then transmit the data to the mobile endpoint from the buffer. For example, when the second base station receives the multicast data (while still the target base station) it may simply store the data in a buffer. Then when the target base station becomes the serving base station its buffer may already contain the data for the mobile endpoint and it may be able to seamlessly continue to transmit the data to the mobile endpoint, continuing where the first base station left off. This transition may be enhanced by the use of sequence numbers as discussed above; the second base station may simply transmit the packet of data having the next sequence number after the last successfully transmitted packet of data.

Some of the steps illustrated in FIG. 3 may be combined, modified or deleted where appropriate, and additional steps may also be added to the flowchart. For example, additional steps may be added where the decisions to begin and/or to stop multicasting data for the mobile endpoint is based on a factor other than signal strength. Additionally, steps may be performed in any suitable order without departing from the scope of the invention.

As indicated above, technical advantages of particular embodiments include methods and systems that enable a network comprising multiple base stations to handoff a mobile endpoint between base stations in such a way as to reduce or eliminate data loss and/or latency. Thus providing the mobile endpoint with a user experience that more closely approximates the user experience achieved via a wired network connection. This allows for a more reliable user experience. Furthermore, buy implementing policies that limit the use of multicasting during handoffs, a service provided may have more options for billing and distinguishing their services from the services provided by others.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30, these elements may be combined, rearranged or positioned in order to accommodate particular routing architectures or needs. In addition, any of these elements may be provided as separate external components to communication system 30, where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for handling a mobile endpoint in a wireless network, comprising:
    routing data for a mobile endpoint through a first base station, the mobile endpoint wirelessly connected to the first base station and having a first signal strength at the first base station;
    prior to connection of the mobile endpoint to a second base station, routing data for the mobile endpoint through the first base station and the second base station, the mobile endpoint wirelessly connected to the first base station and having a second signal strength at the second base station, the second signal strength being above a first level; and
    routing data for the mobile endpoint through the second base station, the mobile endpoint wirelessly connected to the second base station and having a third signal strength at the second base station, the third signal strength being above a second level.

2. The method of claim 1, wherein routing data for the mobile endpoint through the first base station and the second base station comprises multicasting data for the mobile endpoint to the first base station and the second base station.

3. The method of claim 1, wherein routing data for the mobile endpoint through the first base station and the second base station comprises routing data for the mobile endpoint through the first base station and the second base station upon satisfying a condition of a policy.

4. The method of claim 3, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

5. The method of claim 1, further comprising buffering the data for the mobile endpoint at the second base station while the mobile endpoint is connected to the first base station.

6. The method of claim 1:
    further comprising enabling a sequence number in the data for the mobile endpoint, the data comprising data packets, each data packet numbered with a sequence number; and
    wherein routing data for the mobile endpoint through the second base station comprises:
        determining the sequence number of the last data packet successfully routed to the mobile endpoint through the first base station; and
        sending data packets to the mobile endpoint through the second base station, the data packets having sequence numbers greater than the sequence number of the last data packet successfully routed to the mobile endpoint through the first base station.

7. A method for handling a mobile endpoint in a wireless network, comprising:
    detecting a mobile endpoint having a signal strength;
    upon the signal strength exceeding a first threshold, receiving data for the mobile endpoint, the data for the mobile endpoint also sent to a first base station, the first base station sending the data to the mobile endpoint via a first wireless connection; and
    upon the signal strength exceeding a second threshold:
        establishing a second wireless connection with the mobile endpoint, the second wireless connection with the mobile endpoint terminating the first wireless connection between the mobile endpoint and the first base station; and
        sending the data to the mobile endpoint via the second wireless connection.

8. The method of claim 7, wherein receiving data for the mobile endpoint, the data for the mobile endpoint also sent to a first base station, comprises receiving multicasted data for the mobile endpoint, the multicasted data for the mobile endpoint also sent to the first base station.

9. The method of claim 7, further comprising, prior to receiving data for the mobile endpoint, satisfying a condition of a policy.

10. The method of claim 9, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

11. The method of claim 7, further comprising buffering the data for the mobile endpoint.

12. The method of claim 7, wherein:
    the data for the mobile endpoint comprises data packets, each data packet numbered with a sequence number, for the mobile endpoint; and
    sending the data to the mobile endpoint via the second wireless connection comprises:
        determining the sequence number of the last data packet successfully sent to the mobile endpoint by the first base station via the first wireless connection; and
        sending data packets to the mobile endpoint, the data packets having sequence numbers greater than the sequence number of the last data packet successfully sent to the mobile endpoint by the first base station via the first wireless connection.

13. A system for handling a mobile endpoint in a wireless network, comprising:
- a gateway coupled to a plurality of base stations, the gateway operable to:
  - route data for a mobile endpoint through a first base station of the plurality of base stations, the mobile endpoint wirelessly connected to the first base station and having a first signal strength at the first base station;
  - prior to connection of the mobile endpoint to a second base station of the plurality of base stations, route data for the mobile endpoint through the first base station and the second base station of the plurality of base stations, the mobile endpoint wirelessly connected to the first base station and having a second signal strength at the second base station, the second signal strength being above a first level; and
  - route data for the mobile endpoint through the second base station, the mobile endpoint wirelessly connected to the second base station and having a third signal strength at the second base station, the third signal strength being above a second level.

14. The system of claim 13, wherein the gateway operable to route data for the mobile endpoint through the first base station and the second base station comprises a gateway operable to multicast data for the mobile endpoint to the first base station and the second base station.

15. The system of claim 13, wherein the gateway operable to route data for the mobile endpoint through the first base station and the second base station comprises a gateway operable to route data for the mobile endpoint through the first base station and the second base station upon satisfying a condition of a policy.

16. The system of claim 15, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

17. The system of claim 13, wherein the second base station is operable to buffer the data for the mobile endpoint while the mobile endpoint is connected to the first base station.

18. The system of claim 13:
- wherein the gateway is further operable to enable a sequence number in the data for the mobile endpoint, the data comprising data packets, each data packet numbered with a sequence number; and
- wherein the gateway operable to route data for the mobile endpoint through the second base station comprises a gateway operable to:
  - determine the sequence number of the last data packet successfully routed to the mobile endpoint through the first base station; and
  - send data packets to the mobile endpoint through the second base station, the data packets having sequence numbers greater than the sequence number of the last data packet successfully routed to the mobile endpoint through the first base station.

19. A system for handling a mobile endpoint in a wireless network, comprising:
- an interface operable to:
  - detect a mobile endpoint having a signal strength; and
  - upon the signal strength exceeding a first threshold, receive data for the mobile endpoint, the data for the mobile endpoint also sent to a first base station, the first base station operable to send the data to the mobile endpoint via a first wireless connection; and
- a processor coupled to the interface and operable to, upon the signal strength exceeding a second threshold establish a second wireless connection with the mobile endpoint, the second wireless connection with the mobile endpoint terminating the first wireless connection between the mobile endpoint and the first base station, and wherein the interface is further operable to send the data to the mobile endpoint via the second wireless connection.

20. The system of claim 19, wherein the interface operable to receive data for the mobile endpoint, the data for the mobile endpoint also sent to a first base station, comprises an interface operable to receive multicasted data for the mobile endpoint, the multicasted data for the mobile endpoint also sent to the first base station.

21. The system of claim 19, wherein the processor is further operable to, prior to receiving data for the mobile endpoint, determine that a condition of a policy is satisfied.

22. The system of claim 21, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

23. The system of claim 19, further comprising a memory module operable to buffer the data for the mobile endpoint.

24. The system of claim 19, wherein:
- the data for the mobile endpoint comprises data packets, each data packet numbered with a sequence number, for the mobile endpoint;
- the processor is further operable to determine the sequence number of the last data packet successfully sent to the mobile endpoint by the first base station via the first wireless connection; and
- the interface operable to send the data to the mobile endpoint via the second wireless connection comprises an interface operable to send data packets to the mobile endpoint, the data packets having sequence numbers greater than the sequence number of the last data packet successfully sent to the mobile endpoint by the first base station via the first wireless connection.

25. A tangible computer readable storage medium comprising executable code that when executed by a processor is operable to:
- route data for a mobile endpoint through a first base station, the mobile endpoint wirelessly connected to the first base station and having a first signal strength at the first base station;
- prior to connection of the mobile endpoint to a second base station, route data for the mobile endpoint through the first base station and the second base station, the mobile endpoint wirelessly connected to the first base station and having a second signal strength at the second base station, the second signal strength being above a first level; and
- route data for the mobile endpoint through the second base station, the mobile endpoint wirelessly connected to the second base station and having a third signal strength at the second base station, the third signal strength being above a second level.

26. The medium of claim 25, wherein the code operable to route data for the mobile endpoint through the first base station and the second base station comprises code operable to multicast data for the mobile endpoint to the first base station and the second base station.

27. The medium of claim 25, wherein the code operable to route data for the mobile endpoint through the first base station and the second base station comprises code operable to route data for the mobile endpoint through the first base station and the second base station upon satisfying a condition of a policy.

28. The medium of claim 27, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

29. The medium of claim 25, wherein the code is further operable to buffer the data for the mobile endpoint at the second base station while the mobile endpoint is connected to the first base station.

30. The medium of claim 25:
   wherein the code is further operable to enable a sequence number in the data for the mobile endpoint, the data comprising data packets, each data packet numbered with a sequence number; and
   wherein the code operable to route data for the mobile endpoint through the second base station comprises code operable to:
      determine the sequence number of the last data packet successfully routed to the mobile endpoint through the first base station; and
      send data packets to the mobile endpoint through the second base station, the data packets having sequence numbers greater than the sequence number of the last data packet successfully routed to the mobile endpoint through the first base station.

31. A tangible computer readable storage medium comprising executable code that when executed by a processor is operable to:
   detect a mobile endpoint having a signal strength;
   upon the signal strength exceeding a first threshold, receive data for the mobile endpoint, the data for the mobile endpoint also sent to a first base station, the first base station sending the data to the mobile endpoint via a first wireless connection; and
   upon the signal strength exceeding a second threshold:
      establish a second wireless connection with the mobile endpoint, the second wireless connection with the mobile endpoint terminating the first wireless connection between the mobile endpoint and the first base station; and
      send the data to the mobile endpoint via the second wireless connection.

32. The medium of claim 31, wherein the code operable to receive data for the mobile endpoint, the data for the mobile endpoint also sent to a first base station comprises code operable to receive multicasted data for the mobile endpoint, the multicasted data for the mobile endpoint also sent to a first base station.

33. The medium of claim 31, wherein the code is further operable to, prior to receiving data for the mobile endpoint, determine that a condition of a policy is satisfied.

34. The medium of claim 33, wherein the condition of the policy comprises a condition selected from the group consisting of a user profile associated with a user of the mobile endpoint, a data type of the data for the mobile endpoint, a hardware type for the first base station, the second base station or the mobile endpoint, and the load on the hardware type.

35. The medium of claim 31, wherein the code is further operable to buffer the data for the mobile endpoint.

36. The medium of claim 31, wherein:
   the data for the mobile endpoint comprises data packets, each data packet numbered with a sequence number, for the mobile endpoint; and
   the code operable to send the data to the mobile endpoint via the second wireless connection comprises code operable to:
      determine the sequence number of the last data packet successfully sent to the mobile endpoint by the first base station via the first wireless connection; and
      send data packets to the mobile endpoint having sequence numbers greater than the sequence number of the last data packet successfully sent to the mobile endpoint by the first base station via the first wireless connection.

37. A system for handling a mobile endpoint in a wireless network, comprising:
   means for routing data for a mobile endpoint through a first base station, the mobile endpoint wirelessly connected to the first base station and having a first signal strength at the first base station;
   means for, prior to connection of the mobile endpoint to a second base station, routing data for the mobile endpoint through the first base station and the second base station, the mobile endpoint wirelessly connected to the first base station and having a second signal strength at the second base station, the second signal strength being above a first level; and
   means for routing data for the mobile endpoint through the second base station, the mobile endpoint wirelessly connected to the second base station and having a third signal strength at the second base station, the third signal strength being above a second level.

38. A system for handling a mobile endpoint in a wireless network, comprising:
   means for detecting a mobile endpoint having a signal strength;
   means for, upon the signal strength exceeding a first threshold, receiving data for the mobile endpoint, the data for the mobile endpoint also sent to a first base station, the first base station sending the data to the mobile endpoint via a first wireless connection; and
   means for, upon the signal strength exceeding a second threshold:
      establishing a second wireless connection with the mobile endpoint, the second wireless connection with the mobile endpoint terminating the first wireless connection between the mobile endpoint and the first base station; and
      sending the data to the mobile endpoint via the second wireless connection.

* * * * *